(12) United States Patent
Fabre et al.

(10) Patent No.: US 10,415,404 B2
(45) Date of Patent: Sep. 17, 2019

(54) VARIABLE-PITCH VANE

(71) Applicant: SNECMA, Paris (FR)

(72) Inventors: Adrien Fabre, Montrouge (FR);
Adrien Laurenceau, Melun (FR);
Jonathan Vlastuin, Charenton (FR)

(73) Assignee: SAFRAN AIRCRAFT ENGINES,
Paris (FR)

( * ) Notice: Subject to any disclaimer, the term of this patent is extended or adjusted under 35 U.S.C. 154(b) by 871 days.

(21) Appl. No.: 14/771,787

(22) PCT Filed: Feb. 27, 2014

(86) PCT No.: PCT/FR2014/050433
§ 371 (c)(1),
(2) Date: Aug. 31, 2015

(87) PCT Pub. No.: WO2014/132002
PCT Pub. Date: Sep. 4, 2014

(65) Prior Publication Data
US 2016/0017728 A1  Jan. 21, 2016

(30) Foreign Application Priority Data
Mar. 1, 2013  (FR) ...................................... 13 51848

(51) Int. Cl.
*F01D 7/00* (2006.01)
*B64C 11/36* (2006.01)
(Continued)

(52) U.S. Cl.
CPC ................ *F01D 7/00* (2013.01); *B64C 11/36* (2013.01); *F01D 5/02* (2013.01); *F01D 5/12* (2013.01);
(Continued)

(58) Field of Classification Search
CPC ..... B64C 11/36; B64D 2027/005; F01D 5/02; F01D 5/12; F01D 7/00; F05D 2220/30;
(Continued)

(56) References Cited

U.S. PATENT DOCUMENTS

| 4,767,270 A | 8/1988 | Seidel |
| 5,154,580 A | 10/1992 | Hora |
| 2013/0011259 A1 | 1/2013 | Balk et al. |

FOREIGN PATENT DOCUMENTS

| DE | 102007028142 | 12/2008 |
| GB | 1251955 | 11/1971 |

OTHER PUBLICATIONS

English Machine Translation of DE 10 2007 028142 A1 (translated on Mar. 23, 2018, Espacenet).*

(Continued)

*Primary Examiner* — Mark A Laurenzi
*Assistant Examiner* — Paul W Thiede
(74) *Attorney, Agent, or Firm* — Womble Bond Dickinson (US) LLP

(57) ABSTRACT

A variable-pitch vane including a plurality of propeller blades (2). Each blade has a variable pitch according to a blade rotational axis (A1) and a root (201). A plurality of rotor connecting shafts (6), each shaft having a foot (602) and a head (601). The root (201) of each blade is mounted on the head (601) of a rotor connecting shaft via a pivot (8) in such a way as to allow each blade (2) to rotate according to the blade rotational axis (A1), in which each blade (2) has a blade pitch, such that the blade rotational axis (A1) is inclined relative to a radial axis (A2) passing through the foot (602) of the corresponding shaft.

10 Claims, 11 Drawing Sheets

(51) Int. Cl.
- *F01D 5/02* (2006.01)
- *F01D 5/12* (2006.01)
- *B64D 27/00* (2006.01)

(52) U.S. Cl.
CPC .... *B64D 2027/005* (2013.01); *F05D 2220/30* (2013.01); *F05D 2240/30* (2013.01); *F05D 2260/74* (2013.01); *F05D 2260/79* (2013.01); *Y02T 50/66* (2013.01); *Y02T 50/671* (2013.01); *Y02T 50/673* (2013.01)

(58) Field of Classification Search
CPC ............. F05D 2240/30; F05D 2260/74; F05D 2260/79; Y02T 50/66; Y02T 50/671; Y02T 50/673; F03D 7/0024; F03D 9/25
USPC ...................................... 416/128; 290/44, 55
See application file for complete search history.

(56) References Cited

OTHER PUBLICATIONS

French Search Report and Written Opinion, dated Dec. 11, 2013, French Application No. 1351848.
International Search Report with English Language Translation, dated Oct. 8, 2014, Application No. PCT/FR2014/050433.

\* cited by examiner

PRIOR ART

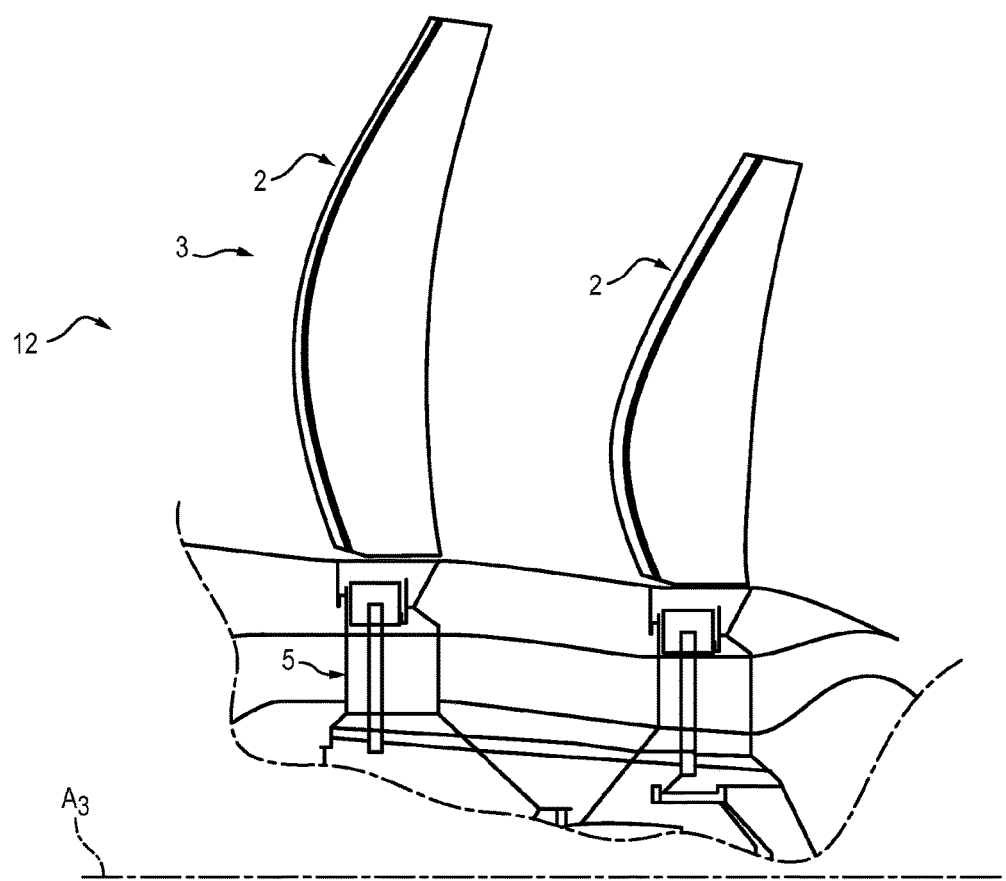

VARIABLE-PITCH VANE

FIELD OF THE INVENTION

The invention relates to variable-pitch blading, as well as a turbomachine including such blading.

PRIOR ART

The blading of turbomachines including at least one rotor and blades with variable geometric pitch are known in the prior art.

Certain turbomachines are of the open rotor or unducted fan type. The fan of a turbomachine of this type typically includes two coaxial external propellers, respectively upstream and downstream, each of which is driven in rotation and which extend substantially radially outside the nacelle of this turbomachine.

Each propeller includes a plurality of blades driven in rotation by the rotor about the axis of the turbomachine or the axis of the propeller.

Geometric pitch is the angle formed by the cord of the profile of the blade and the plane of rotation of the propeller, defined as the plane orthogonal to the axis of rotation of the propeller of the blading.

To this end, as illustrated in FIG. 1, a rotor is known including a radial shaft 6 of which a head 601 is linked to the blade 2 by a pivot 8 wherein a blade root 201 is accommodated.

The rotation of the radial shaft 6 can be controlled by the axial displacement of a link 9. A jack (not shown) can control the axial displacement of the links 9, and thus control uniformly the pitch of the blades 2.

Absent control by the jack, following for example a breakdown of the unit controlling the jack or a failure of the jack, the blades 2 have a tendency, due to their inertia, to assume a pitch of 0° with respect to the plane of rotation of the propeller, meaning that the chord of the profile of the blade 2 is orthogonal to the aerodynamic flow.

This pitch has the drawback of generating a great deal of drag, making the airplane difficult to control, particularly during takeoff.

Consequently, the pitch control devices of the blades 2 conventionally include a mechanism allowing the blades 2 to be brought back to a position wherein the chord of the profile of the blade 2 is orthogonal to the plane of rotation of the propeller. This position is called "feather" by the person skilled in the art. Such a mechanism includes for example counterweights 801 so as to directly counteract the inertia of the blades 2.

The feather position has the advantage of generating low drag, and a low "windmilling" torque (a term used by the person skilled in the art to designate an operating mode wherein the engine is stopped and the propeller is driven in rotation by the relative wind).

However, such a mechanism has a high mass. By way of an example, in unducted fans, the mass of the counterweight 801 of each blade 2 represents about 50% of the mass of a blade 2. The total mass of the counterweights is typically about 100 kg per engine.

Moreover, the rotating structures of the propeller or fan are subjected to the centrifugal loading of these counterweights.

SUMMARY OF THE INVENTION

In order to compensate for the shortcomings of the technique, the invention proposes variable-pitch blading including:

- a plurality of propeller blades, each with a pitch that is variable about a blade axis of rotation, and each having a root,
- a plurality of rotor connecting shafts, each shaft having a root and a head, the root of each blade being mounted on the head of a rotor connecting shaft via a pivot so as to allow rotation of each blade on the blade rotation axis, wherein each blade has a blade inclination such that its blade axis of rotation is inclined with respect to a radial axis passing through the root of the corresponding shaft.

The invention is advantageously supplemented by the following characteristics, taken alone or in any one of their technically feasible combinations:

- the inclination of the blade includes an inclination component tangent to the plane of the propeller;
- the tangential inclination angle toward the extrados is comprised between 5 and 15°;
- the inclination of the blade includes an upstream or downstream inclination component with respect to the plane of the propeller;
- the upstream angle of inclination is comprised between 0 and 2°;
- each shaft is inclined compared to the radial axis, inclining the corresponding blade according to the blade inclination;
- the axis of rotation of the blade is inclined by a fixed value with respect to the radial axis
- the tangent component of inclination and/or the upstream or downstream component of inclination is fixed with respect to the radial axis;
- the tangential inclination angle and the upstream angle of inclination are determined during design, and are therefore frozen by the construction of the device;
- each shaft has an articulation inclining the head of the shaft with respect to the rest of the shaft, and thus inclining the corresponding blade according to the blade inclination;
- the articulation includes a bellows;
- the articulation includes a universal joint.

The invention also relates to a turbomachine including such blading.

The invention also relates to a turbomachine including two such blading, the two blading being counter-rotating blading.

BRIEF DESCRIPTION OF THE FIGURES

Other features and advantages of the invention will appear during the description hereafter of an embodiment. In the appended drawings:

FIG. 2 is a partial representation of a turbomachine in which the blading can be integrated;

DETAILED DESCRIPTION OF THE INVENTION

Turbomachine

Referring to FIG. 2, a portion of the turbomachine 12 has been shown including a fan 3, wherein the vanes or blades 2 belong to two counter-rotating propellers. This is for example a turbomachine of the open rotor or unducted fan type.

Conventionally, a flow of air which enters the turbomachine 12 is compressed, then is mixed with fuel and burned in a combustion chamber, the combustion gases allowing the rotor 5 to be driven in rotation.

The rotor 5 then has a rotary motion about a longitudinal axis $A_3$ of the fan 3, which is transmitted to the blades 2 for driving them in rotation about a longitudinal axis $A_3$.

Blading

Variable Pitch

Figure 6:
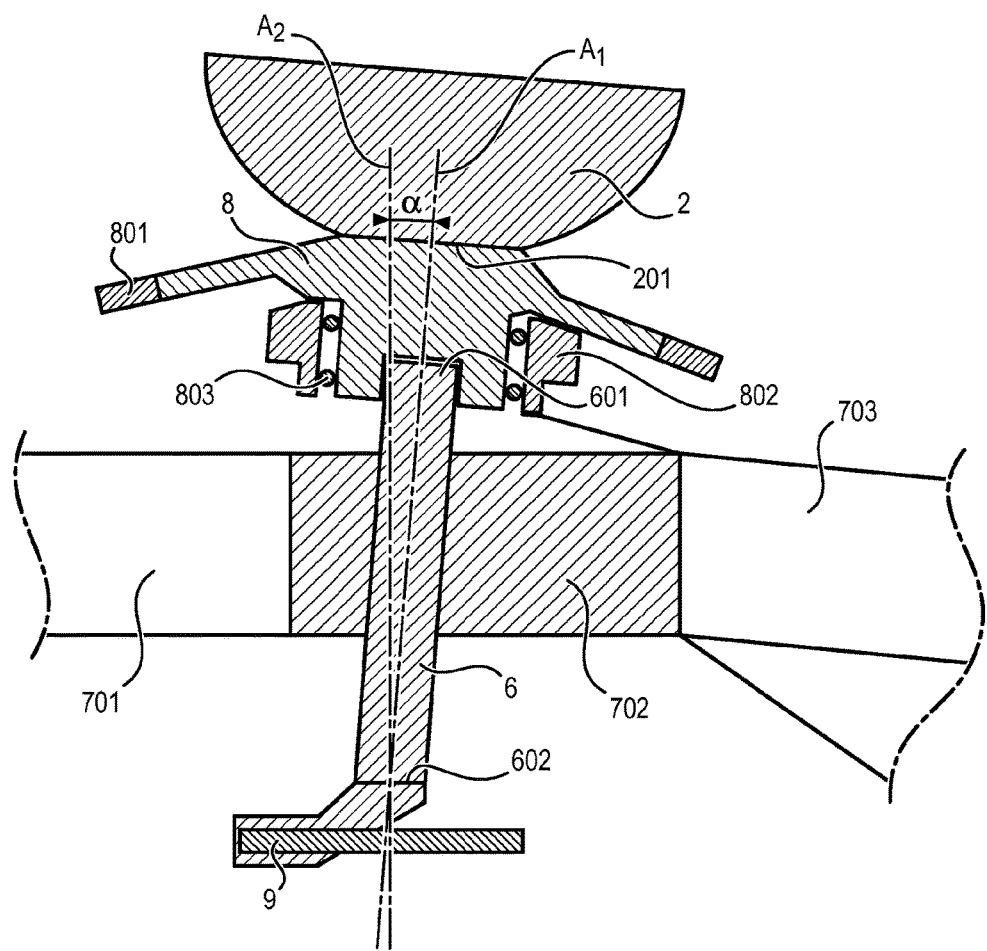
FIG. 6 shows a detail of a blading including an inclined connecting shaft according to one embodiment of the invention.
Figure 7:
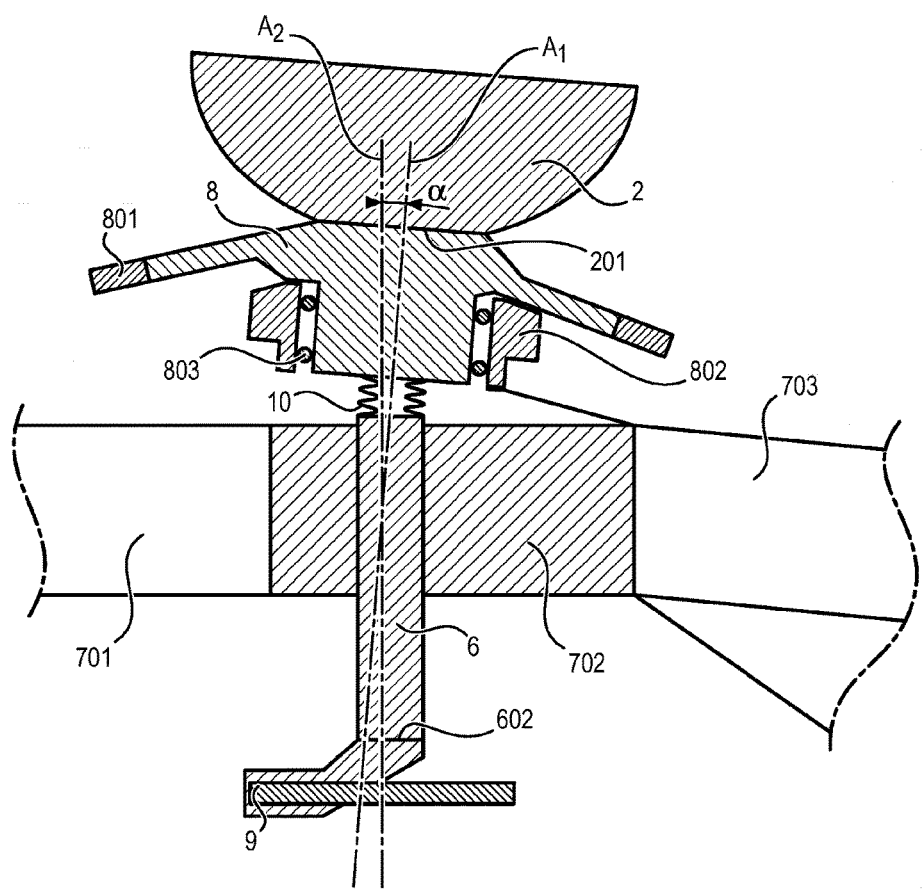
FIG. 7 shows a detail of a blading including a bellows according to another embodiment of the invention.
Figure 8:
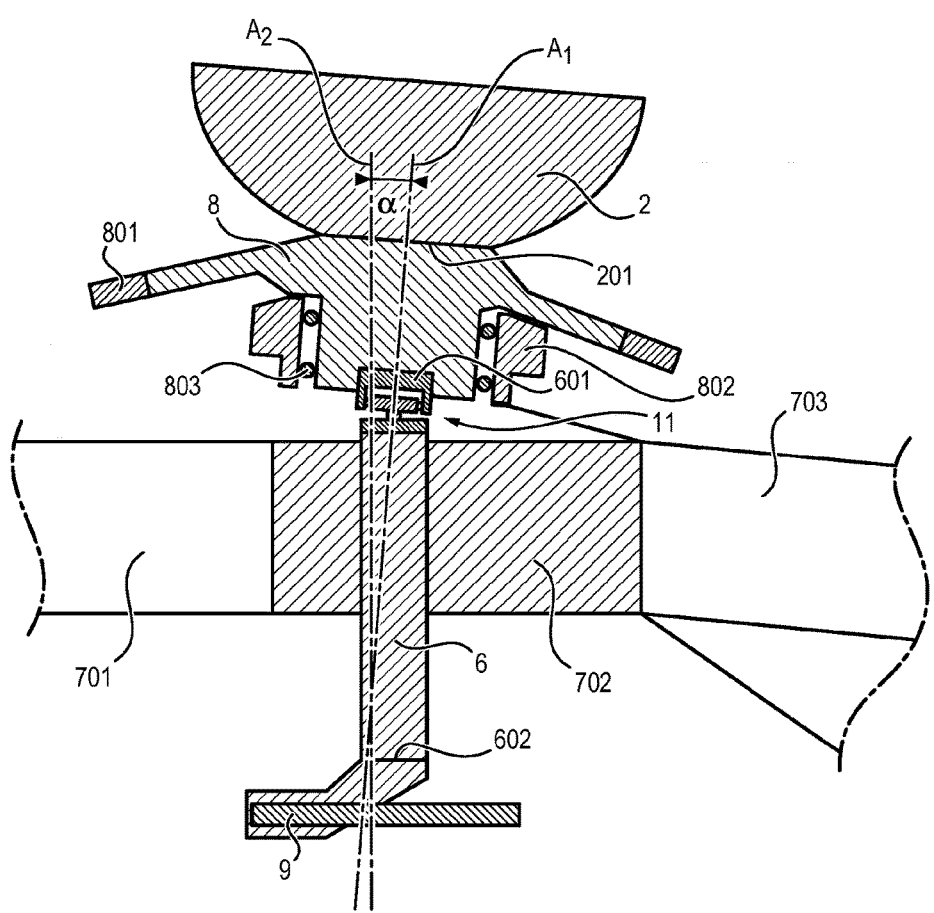
FIG. 8 shows a detail of a blading including a universal joint according to yet another embodiment of the invention.

Referring to FIGS. 6 to 8, the blading of blades 2 according to the invention is described.

As stated previously, the geometric pitch is the angle formed by the chord of the profile of a blade 2 and the plane of rotation of the corresponding propeller 4. Hereafter only the term "pitch" will be used as it is generally used in the prior art.

Note that pitch is an algebraic value. For example, a pitch of −90° corresponds to a pitch for which the leading edge of the blade 2 is located to the rear.

The pitch of the blades 2 of the propeller is adapted to flight conditions: on the ground, for example, pitch is close to 10°, at takeoff, between 35° and 45°, and in climb, between 45° and 60°. At cruise, the pitch is nearly 65°.

90° pitch is conventionally called the "feather" position by the person skilled in the art; 0° pitch is the "flat" position and −30° pitch is the "reverse" position (this position makes it possible to brake the aircraft).

The blading includes a plurality of blades 2 of a blading. Each 25 blade 2 has variable pitch on a blade axis of rotation A1. Each blade 2 has a root 201.

The blading has a plurality of rotor connecting shafts 6. Each connecting shaft 6 is designed so that its rotation modifies the pitch of one of the blades 2. Each connecting shaft 6 has a root 602 and a head 601. The shafts 6 are for example positioned in a rotating casing arm 702, 7 between a duct coming from the turbine 701 and a duct directed toward the nozzle 703.

Conventionally, the blade 2 is connected to the corresponding connecting shaft 6 by a dedicated pivot 8 so as to allow the rotation of each blade 2 about the axis of rotation $A_1$ of blade 2. The pivot 8 can include counterweights 801. Thus the root 201 of the blade 2 can be accommodated in the pivot 8. The pivots 8 are for example mounted in an axisymmetric ring 802 having a plurality of substantially cylindrical radial recesses, this ring 802 being generally called the polygonal ring. Ball bearings 803 positioned between the polygonal ring 802 and the pivot 8 allow the pivot 8 to maintain a degree of freedom with respect to the polygonal ring 802.

The device also includes parts capable of being displaced jointly in an axial direction so as to bring about the rotation of the connecting shaft 6. The parts include generally a link 9, of which one end is connected to the connecting shaft 6. Each link 9 is connected to a connecting shaft 6 of a blade 2.

The device 1 can further include at least one jack (not shown) controlling the displacement of the link 9 in the axial direction.

The pitch of the blade 2 can be modified by the axial extension of the link of the jack, which acts on the link 9 in axial translation.

Blade Inclination

Each blade 2 has a blade inclination, each blade axis of rotation $A_1$ being inclined relative to a radial axis $A_2$, the radial axis $A_2$ passing by the root 602 of the corresponding shaft 6.

Figure 1:
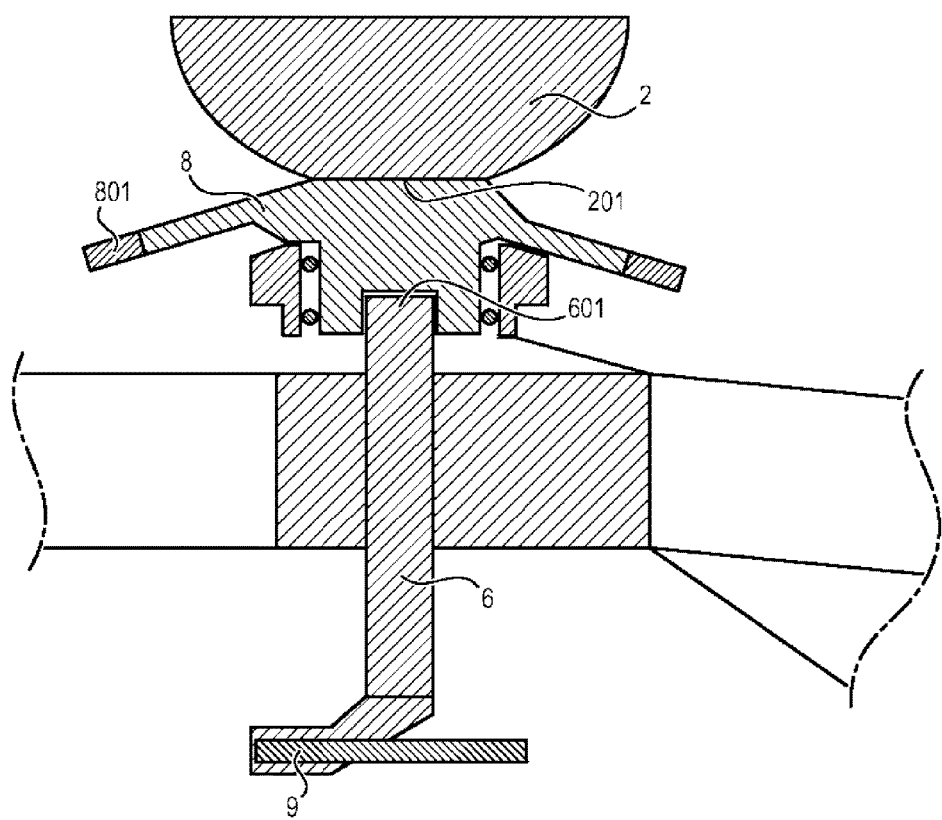
FIG. 1 is a partial representation of a blading of the prior art.
Figure 3A:
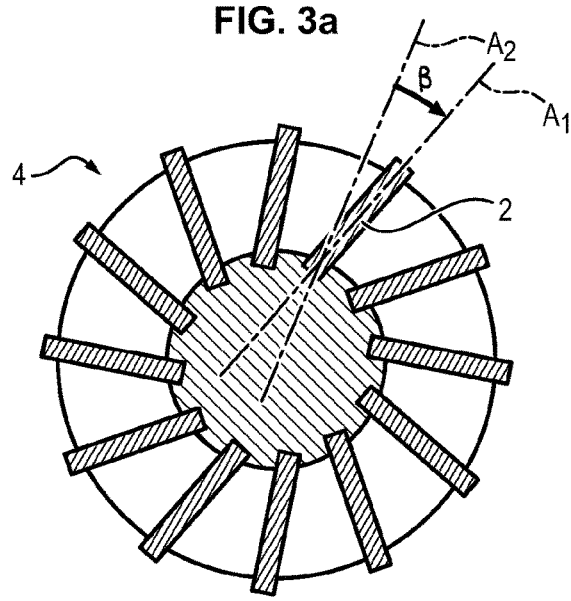
FIG. 3a is a schematic representation of a tangent blade inclination in the plane of the propeller of a blading.

As illustrated in FIG. 3a, the inclination of the blade can include a tangent inclination component β in the plane of the propeller. In this manner, the center of gravity of the blade 2 is found to be noticeably eccentric with respect to the corresponding radial axis $A_2$ and with respect to the propeller axis $A_3$. The restoring moment under centrifugal force of a blade 2 of a blading according to the prior art includes only the product of inertia. Due to the inclination of the blade 2, the restoring moment includes several linearly combined terms, involving the tangent inclination component β and an upstream or downstream inclination component α, and now depends on the mass and on the position of the center of gravity of the blade 2. It is thus possible to improve the mechanical performance of the blades 2 and therefore of the blading by inclining tangentially the blades 2. It is for example possible to install a more effective counterweight 801 because the radius of its center of gravity, that is the distance of its center of gravity from the engine axis about which the blading is driven, will vary as a function of pitch.

By convention, α is considered positive for an upstream upstream-downstream tilt and β positive for a tangent tilt in the direction defined by the rotation of the propeller, that is toward the intrados.

Figure 3B:
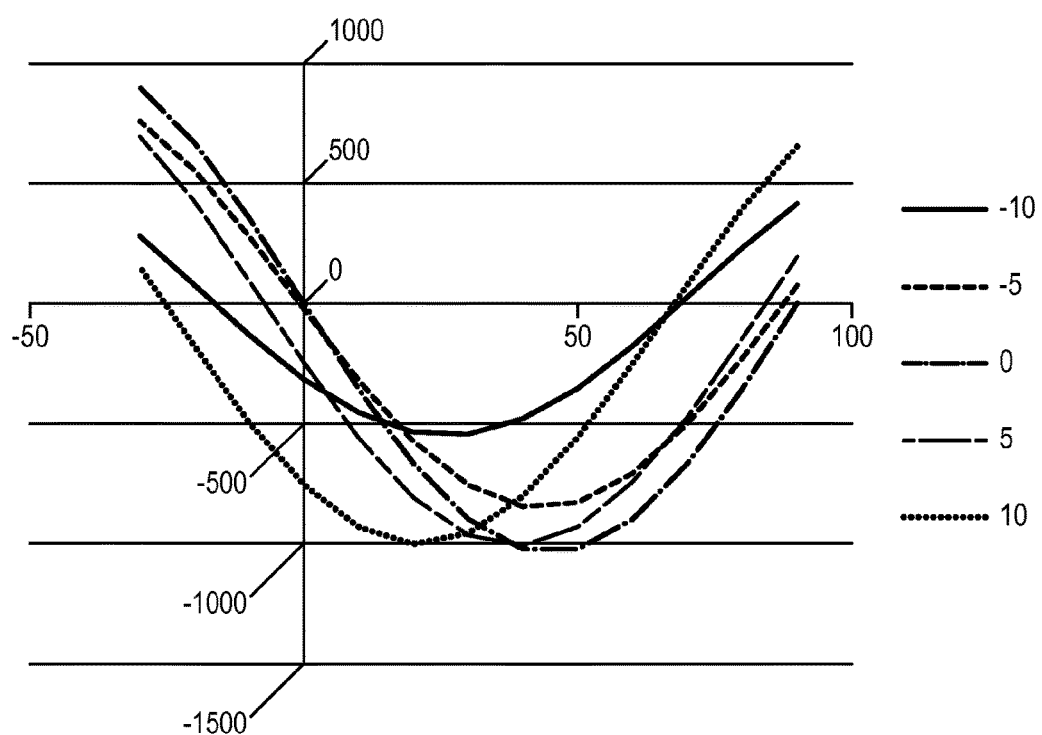
FIG. 3b is a graphic representation of the progression of the restoring moment as a function of the pitch for different values of the tangent inclination of the blade.

Thus FIG. 3b shows the evolution of the restoring moment as a function of pitch for different values of a purely tangent inclination of the blade β. Absent an inclination of the blade, a stable equilibrium position is still observed at 0°, and an unstable equilibrium at 90°, the negative extreme being situated at about 45°. It is observed that a tangential inclination angle of −10° with respect to the direction defined by the counter-clockwise rotation of the propeller in FIG. 3b makes it possible to reduce by a factor of around two the absolute value of the negative extreme of the restoring moment of the blade.

The mechanical performance can also be improved by an inclination of the blade including an upstream or downstream inclination component a with respect to the plane of the propeller.

Moreover, the blading is brought to operate under varied aerodynamic conditions depending on flight conditions such as takeoff, climb or cruise. It is known that these different flight conditions imply different blading geometries.

Pitch variation by rotation of the blade 2 only with the axis of rotation $A_1$ as described in the prior art, limits the possibilities of compromise on a blading geometry adapted to the different flight conditions.

The introduction of a blade inclination also makes it possible to improve the aerodynamic performance of the blading. The inclination of the blade makes it possible to improve the pitch variation between the root 201 of the blade and a head of the blade 2.

Figure 4A:
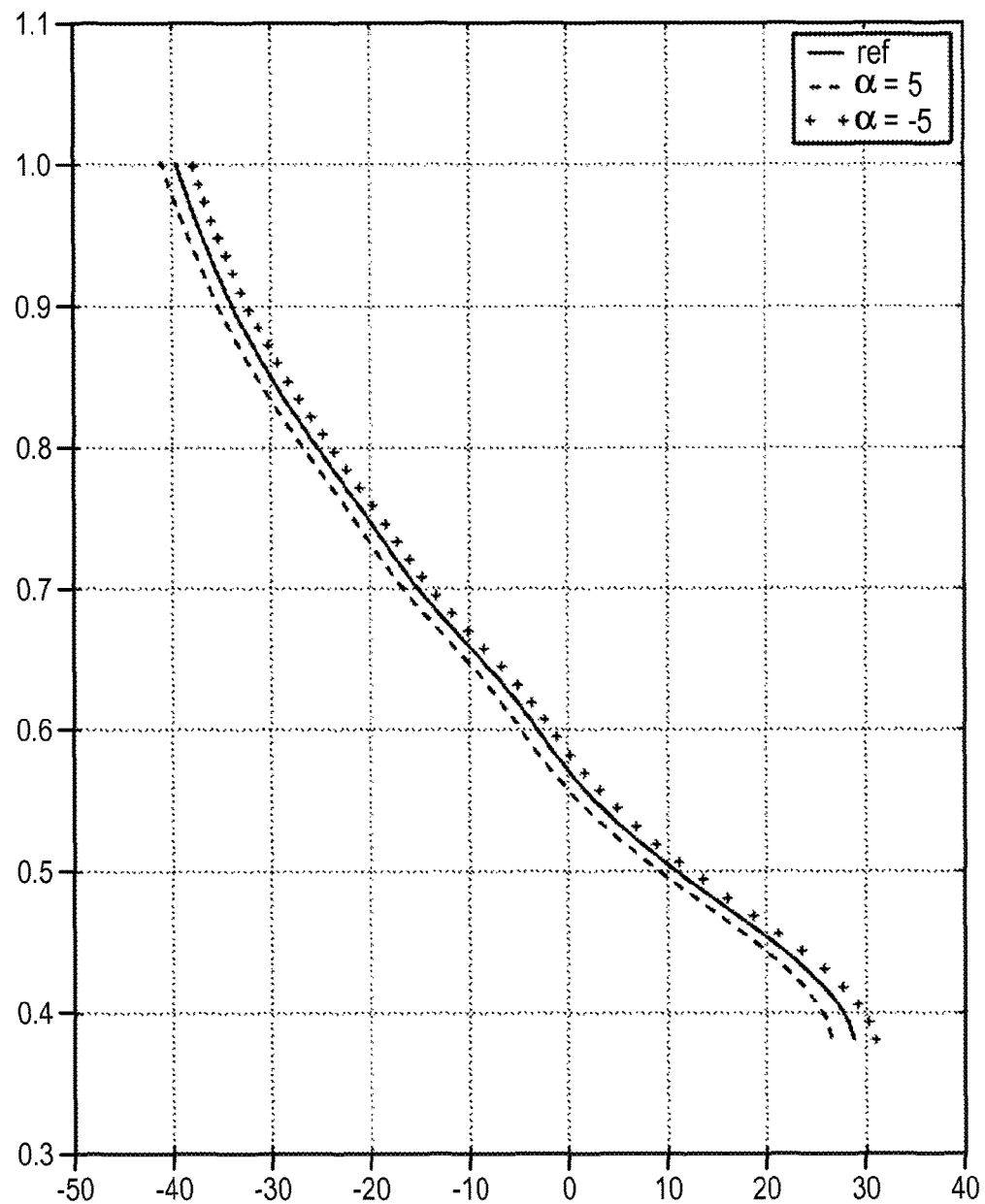
FIG. 4a is a graphic representation of the height of the blade as a function of the quarter-chord sweep of the leading edge at the blade head, the sweep being expressed in degrees and the height normalized to the outer radius (equal to 0 on the engine axis and equal to 1 at the blade head), for different values of the upstream-downstream tilt inclination component.
Figure 4B:
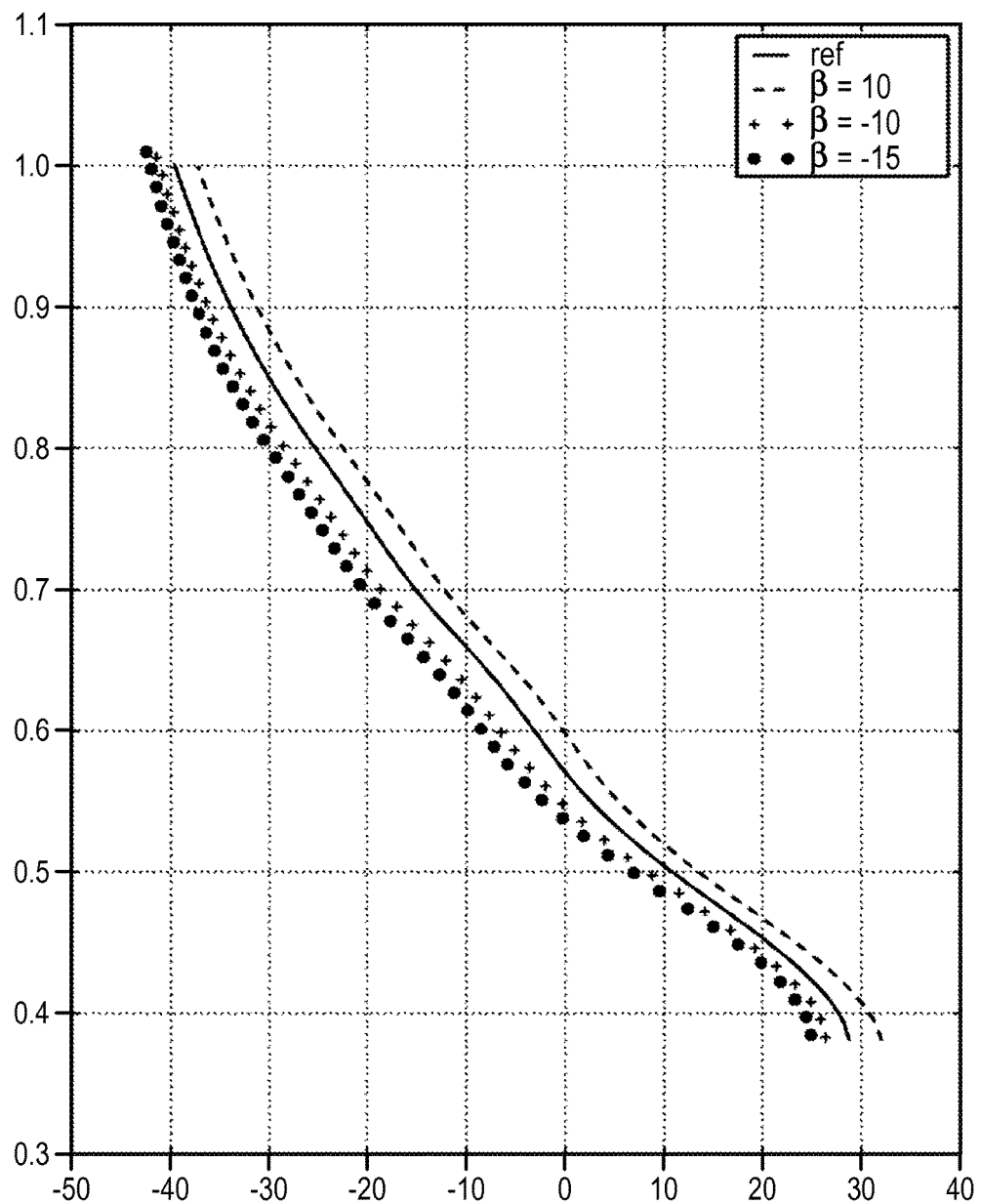
FIG. 4b is a graphic representation of the height of the blade as a function of the quarter-chord sweep of the leading edge at the blade head, the sweep being expressed in degrees and the height normalized to the outer radius for different values of the tangent tilt inclination component.

For example, with reference to FIGS. 4a and 4b, the inclination of the blade makes it possible to vary the sweep of the blade as a function of flight conditions. FIG. 4a represents the height of the blade as a function of the quarter-chord leading edge sweep at the head of the blade during passage from the point in the drawing corresponding to max-climb to the takeoff condition, the sweep being expressed in degrees and the height normalized to the outer radius for different values of the upstream-downstream tilt inclination component $\alpha$. For $\alpha=-5°$, an additional sweep of 2° is observed.

FIG. 4b represents the height of the blade as a function of the quarter-chord sweep of the leading edge at the head of the blade during passage from the point in the drawing corresponding to max-climb to the takeoff conditions, the sweep being expressed in degrees and the height normalized to the outer radius for different values of the tangent inclination component $\beta$ or extrados-intrados inclination. It is noted that an upstream-downstream tilt inclination component $\beta$ of −10° allows a supplementary sweep of 2°.

Figure 5A:
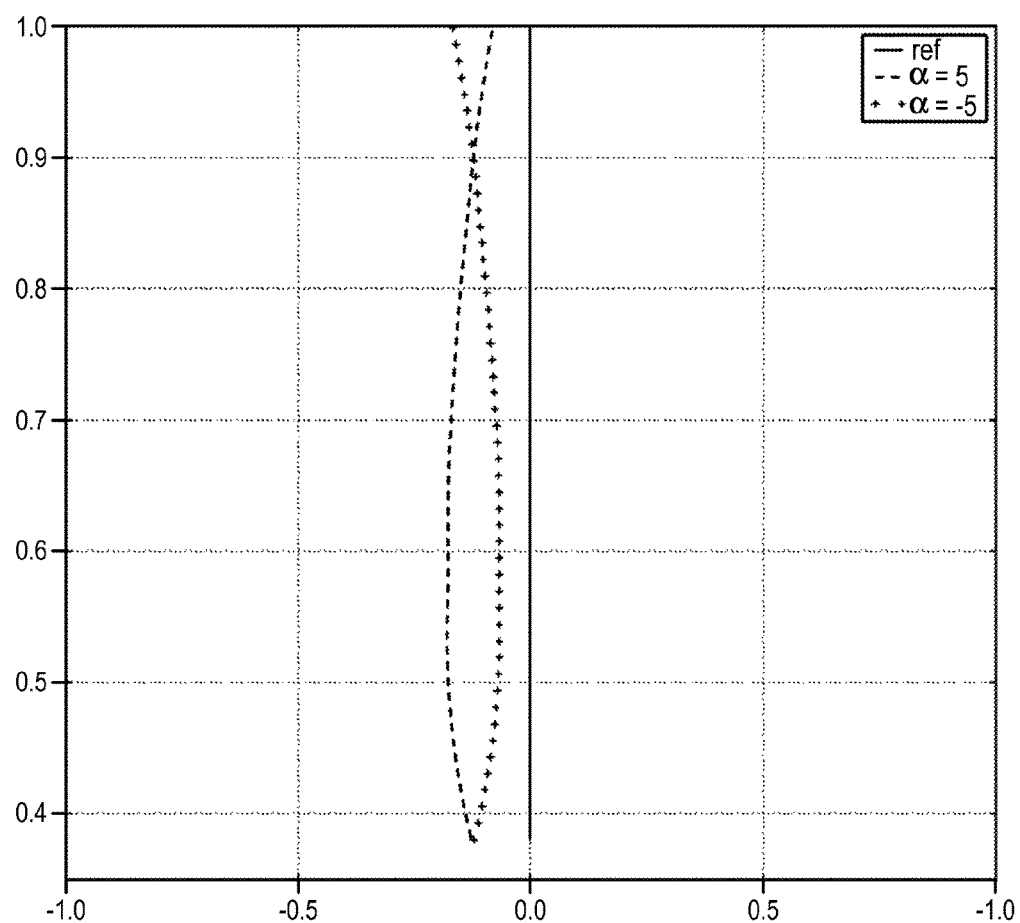
FIG. 5a is a graphic representation of the height of the blade as a function of the rake of the blade, the rake being expressed in degrees and the height normalized to the outer radius, for different values of the upstream-downstream tilt inclination component.
Figure 5B:
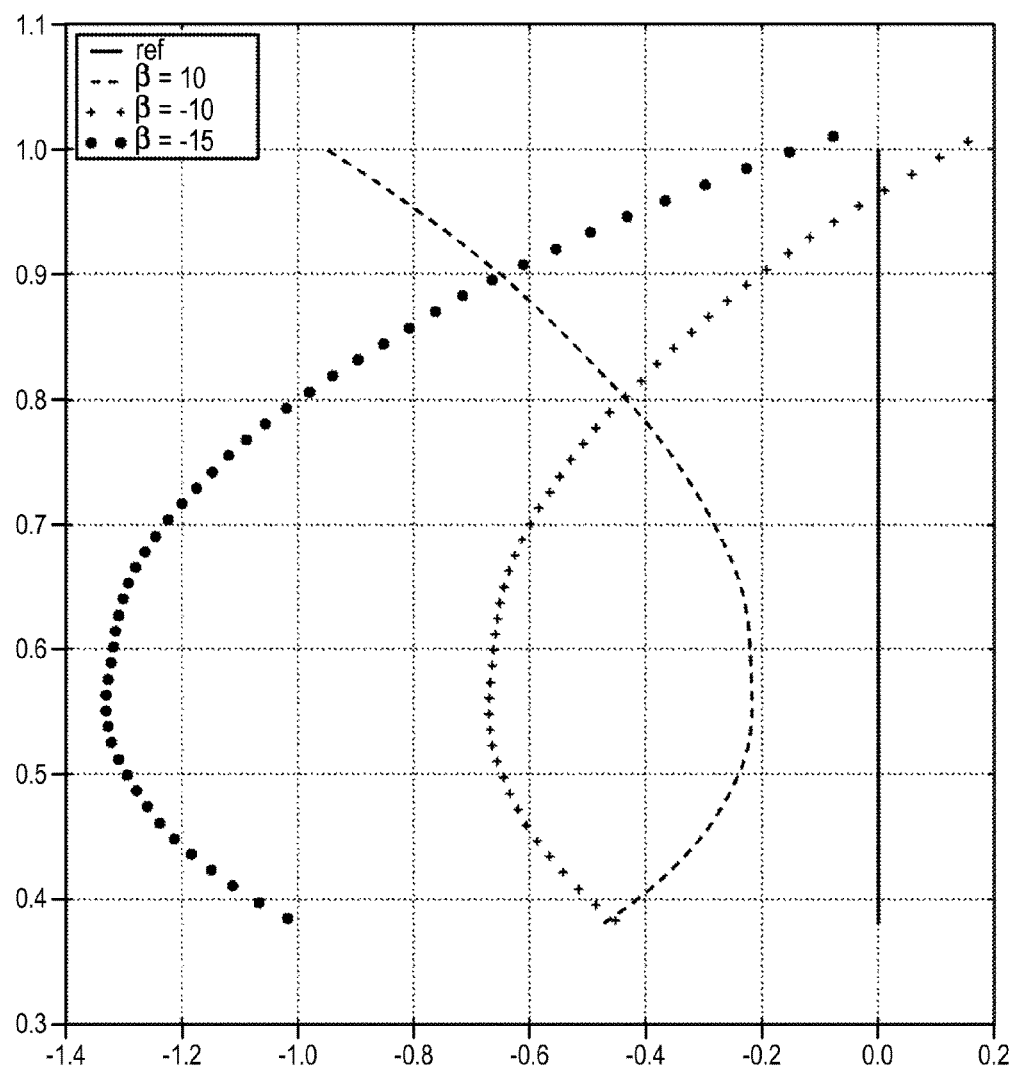
FIG. 5b is a graphic representation of the height of the blade as a function of the rake of the blade, the rake being expressed in degrees and the height being normalized to the outer radius, for different values of the tangent inclination component.

For example, with reference to FIGS. 5a and 5b, the inclination of the blade makes it possible to vary rake over the span of the blade as a function of flight conditions. FIG. 5a shows the height of the blade as a function of rake of the blade during passage from the point in the drawing corresponding to max climb to the takeoff condition, rake being expressed in degrees and the height normalized to outer radius for different values of the upstream-downstream tilt inclination component $\alpha$. An increase in the rake at the head at takeoff is noted when $\alpha$ is positive. In particular, for $\alpha=5°$, an excess rake of 0.1° is noted.

FIG. 5b shows the height of the blade depending on the rake of the blade during passage from the point in the drawing corresponding to max climb to the takeoff condition, rake being expressed in degrees and height normalized to the outer radius, for different values of the tangent inclination component $\beta$ or extrados-intrados tilt inclination. An increase in rake at the head at takeoff is noted when $\beta$ is negative. In particular, for $\beta=10°$, an excess rake of 0.5° is noted.

The inclination of the blade thus makes it possible to accentuate the differences between the root and the head of the blade, for example by increasing rake at the head level while retaining rake at the belly or center of the blade, which drives back the separation limit at the blade head at takeoff and favors stability of the blading, as well as its acoustic performance. Inclination of the blade also makes it possible to modify apparent swirl parameters.

Figure 5C:
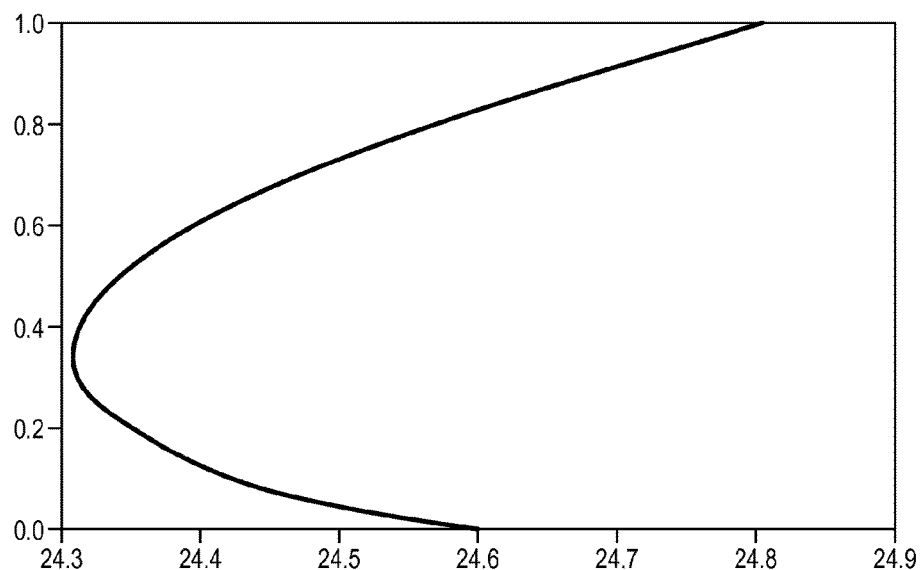
FIG. 5c is a graphic representation of the height of the blade as a function of the rake of the blade, the rake being expressed in degrees and the height being normalized to the outer radius, for an inclination of the blade including an upstream inclination component and a tangent inclination component.

Thus, in the context of a an aerodynamic design process for a variable-pitch blading, excess rake at the head is sought at takeoff compared to the max-climb condition, so as to reduce angle of attack at the head at takeoff. Here the purpose is to improve acoustic conditions, for example by limitation of separation and/or vortex generation, or by reduction in aerodynamic loading. Such an excess rake is sought by modifying parameters $\beta$ and $\alpha$, particularly in the case where $\beta$ is negative and $\alpha$ is positive. The progression linked to the tangent inclination $\beta$ is given priority because its effect is greater than that of upstream or downstream inclination $\alpha$. Referring to FIG. 5c, representing the height of the blade as a function of the rake of the blade, rake being expressed in degrees and the height normalized to the outer radius, for a blade inclination consisting of an upstream inclination component $\alpha$ having an angle of 0.9° and a tangent inclination component $\beta$ having an angle of −10°, an excess rake at the head of 0.5° is noted, as well as an increase in sweep on the order of about 2°. It is thus possible to push back the separation limit during the takeoff phase.

Such an increase in rake certainly involves a reduction in lift of 1.5%, but also allows a 3% reduction in drag. Moreover, increasing sweep involves a reduction of 2.5% in lift, but allows a reduction of 5% in drag. Thus such an inclination of the blade allows a drag reduction of 8% for a reduction in lift of 4%. Drag is thus reduced more than lift, which allows an improvement in performance of the blading.

The effect of such sweep on stability is negligible with regard to the amplitudes considered.

Such an inclination of the blades also makes it possible to divide by two the mass of the counterweights 801 needed for the blades 2.

Such advantages can be noted when the tangent inclination component $\beta$ has an angle comprised between −5° and −15°, in particular when the upstream inclination component a is comprised between 0 and 2°.

The blade rotation axis $A_1$ is typically inclined by a fixed value with respect to the radial axis $A_2$. The tangent inclination component $\beta$ and/or the upstream or downstream inclination component $\alpha$ can be fixed with respect to the radial axis $A_2$. In other words, the inclination of each blade can be fixed with respect to the radial axis $A_2$ so as to allow, during operation of the blading, rotation of the blade 2 only about the axis of rotation $A_1$ of the blade 2, the axis of rotation $A_1$ being thus inclined tangentially and/or upstream or downstream to a fixed value with respect to the radial axis $A_2$. Thus, the blade 2 has only a single degree of freedom in rotation, that about the rotation axis $A_1$, no rotation about the two other axes being possible.

The tangent inclination component $\beta$ and/or the upstream or downstream inclination component $\alpha$, in other words the tangential inclination angle and the upstream or downstream inclination angle, are for example determined during design, and can therefore be frozen by the construction of the blading.

During the design process, the combination of upstream inclination component $\alpha$ and the tangent inclination component $\beta$ is determined so as to satisfy predetermined aero-acoustic and mechanical goals.

This combination of an upstream inclination component $\alpha$ and of a tangent inclination component $\beta$, that is to say this combination of angles, is then applied for example to the ball bearings 803. The only degree of freedom remaining is then the angle of rotation of the blade about the axis which is defined by the ball bearing (and which is controlled by the pitch change command via the radial shaft). Angles α and β are for example frozen upon manufacture of the ring 802. As illustrated in FIG. 6, each connecting shaft 6 can be inclined with respect to the radial axis $A_2$, thus inclining the corresponding blade according to the desired blade inclination. Such an implementation is particularly adapted for inclinations of which the tangent and upstream or downstream components do not exceed an absolute value of 5°.

The inclination of the connecting shaft 6 is for example a fixed inclination with respect to the radial axis $A_2$, typically an inclination including a tangent component β and/or the upstream or downstream inclination component α fixed with respect to the radial axis $A_2$.

Alternatively or in addition, each connecting shaft 6 of the rotor can have an articulation inclining the head 601 of the shaft with respect to the rest of the shaft 6, and thus inclining the corresponding blade 2 according to the desired blade inclination.

The articulation can maintain the head 601 of the shaft in a fixed inclination with regard to the radial axis A2, typically an inclination including a tangent component β and/or the upstream or downstream inclination component α fixed with respect to the radial axis A2.

With reference to FIG. 7, such an articulation can include a bellows 10, for example a metallic bellows. Such a bellows 10 is designed to implement an inclination of the blades, the components whereof can have values of several degrees.

With reference to FIG. 8, such an articulation can include a universal joint 11. Such a universal joint 11 is designed to implement an inclination whose components can have values of several tens of degrees.

The turbomachine can thus include such variable-pitch blading. The turbomachine can in particular include two such assemblies of variable-pitch blading, the blading being counter-rotating blading for example.

The invention claimed is:

1. Variable-pitch blading including:
   a plurality of propeller blades, each with variable pitch about a blade axis of rotation ($A_1$) and each having a root,
   a plurality of rotor connecting shafts, each shaft having a root and a head, the root of each blade being assembled on the head of a rotor connecting shaft via a pivot so as to allow rotation of each blade about the blade axis of rotation ($A_1$),
   wherein each blade has a blade inclination such that its blade axis of rotation ($A_1$) is inclined with respect to a radial axis ($A_2$) running through the root of the corresponding shaft, and in that the inclination of the blade includes a tangent inclination component (β) in a plane of a propeller.

2. The blading according to claim 1, wherein a tangential inclination angle toward an extrados is comprised between 5 and 15°.

3. The blading according to claim 1, wherein the blade inclination includes an upstream or downstream inclination component with respect to the plane of the propeller.

4. The blading according to claim 3, wherein the upstream inclination component is between 0 and 2°.

5. The blading according to claim 1, wherein each shaft is inclined with respect to the radial axis ($A_2$), inclining the corresponding blade by the blade inclination.

6. The blading according to claim 1, wherein the head of each shaft has an articulation inclining the head of the shaft with respect to the rest of the shaft, and thus inclining the corresponding blade by the blade inclination.

7. The blading according to claim 6, wherein the articulation includes a bellows.

8. The blading according to claim 6, wherein the articulation includes a universal joint.

9. A turbomachine including a blading according to claim 1.

10. A turbomachine including two counter-rotating variable-pitch bladings, each according to claim 1.

* * * * *